US012586408B2

(12) United States Patent
Ong et al.

(10) Patent No.: US 12,586,408 B2
(45) Date of Patent: Mar. 24, 2026

(54) METHOD AND APPARATUS FOR CANCELLING ANONYMIZATION FOR AN AREA INCLUDING A TARGET

(71) Applicant: NEC Corporation, Tokyo (JP)

(72) Inventors: Hui Lam Ong, Singapore (SG); Wei Jian Peh, Singapore (SG); Hong Yen Ong, Singapore (SG); Qinyu Huang, Singapore (SG)

(73) Assignee: NEC CORPORATION, Tokyo (JP)

( * ) Notice: Subject to any disclaimer, the term of this patent is extended or adjusted under 35 U.S.C. 154(b) by 321 days.

(21) Appl. No.: 18/269,801

(22) PCT Filed: Mar. 3, 2022

(86) PCT No.: PCT/JP2022/009052
§ 371 (c)(1),
(2) Date: Jun. 27, 2023

(87) PCT Pub. No.: WO2023/013125
PCT Pub. Date: Feb. 9, 2023

(65) Prior Publication Data
US 2024/0104955 A1      Mar. 28, 2024

(30) Foreign Application Priority Data
Aug. 5, 2021    (SG) ........................... 10202108597X

(51) Int. Cl.
*G06V 40/16* (2022.01)
*G06V 10/75* (2022.01)
(52) U.S. Cl.
CPC .......... *G06V 40/172* (2022.01); *G06V 10/751* (2022.01)

(58) Field of Classification Search
CPC ....... G06V 10/751; G06V 40/172; H04N 7/18
See application file for complete search history.

(56) References Cited

U.S. PATENT DOCUMENTS

| | | |
|---|---|---|
| 2011/0096922 A1 | 4/2011 | Oya |
| 2014/0226857 A1 | 8/2014 | Mineshita |
| 2019/0238719 A1* | 8/2019 | Alameh ................. H04N 1/448 |
| 2019/0384969 A1 | 12/2019 | Shimauchi et al. |

(Continued)

FOREIGN PATENT DOCUMENTS

| | | |
|---|---|---|
| JP | 2011-091705 A | 5/2011 |
| JP | 2016-012752 A | 1/2016 |

(Continued)

OTHER PUBLICATIONS

JP Office Action for JP Application No. 2024-506552, mailed on Dec. 10, 2024 with English Translation.

(Continued)

*Primary Examiner* — Ruiping Li
(74) *Attorney, Agent, or Firm* — Sughrue Mion, PLLC

(57)      ABSTRACT

In an aspect, there is provided method for cancelling anonymization for an area including a target in an input image, the input image including a plurality of identified subjects, the method comprising: retrieving historical images in which the target has appeared in; identifying an area by comparing the input image and the retrieved historical images to determine if the target has interacted with at least one of the identified subjects; and cancelling anonymization for the area including the target.

11 Claims, 14 Drawing Sheets

(56)          References Cited

U.S. PATENT DOCUMENTS

| | | |
|---|---|---|
| 2020/0234060 A1 | 7/2020 | Tsuda |
| 2020/0394419 A1 | 12/2020 | Takayanagi |
| 2021/0082583 A1 | 3/2021 | Ehrlich et al. |
| 2021/0192816 A1 | 6/2021 | Watanabe et al. |

FOREIGN PATENT DOCUMENTS

| | | |
|---|---|---|
| JP | 2019-083395 A | 5/2019 |
| JP | 2020-115607 A | 7/2020 |
| WO | 2008/078624 A1 | 7/2008 |
| WO | 2017/221644 A1 | 12/2017 |
| WO | 2018/116488 A1 | 6/2018 |

OTHER PUBLICATIONS

JP Office Action for JP Application No. 2024-506552, mailed on Apr. 15, 2024 with English Translation.
International Search Report for PCT Application No. PCT/JP2022/ 009052, mailed on May 24, 2022.

* cited by examiner

202

204

Non-targeted Persons are Anonymised
but other important information are hidden

De-anonymise targeted persons
and the interacted potential associate

4 matched as target person
found in targeted person list

Fig. 12

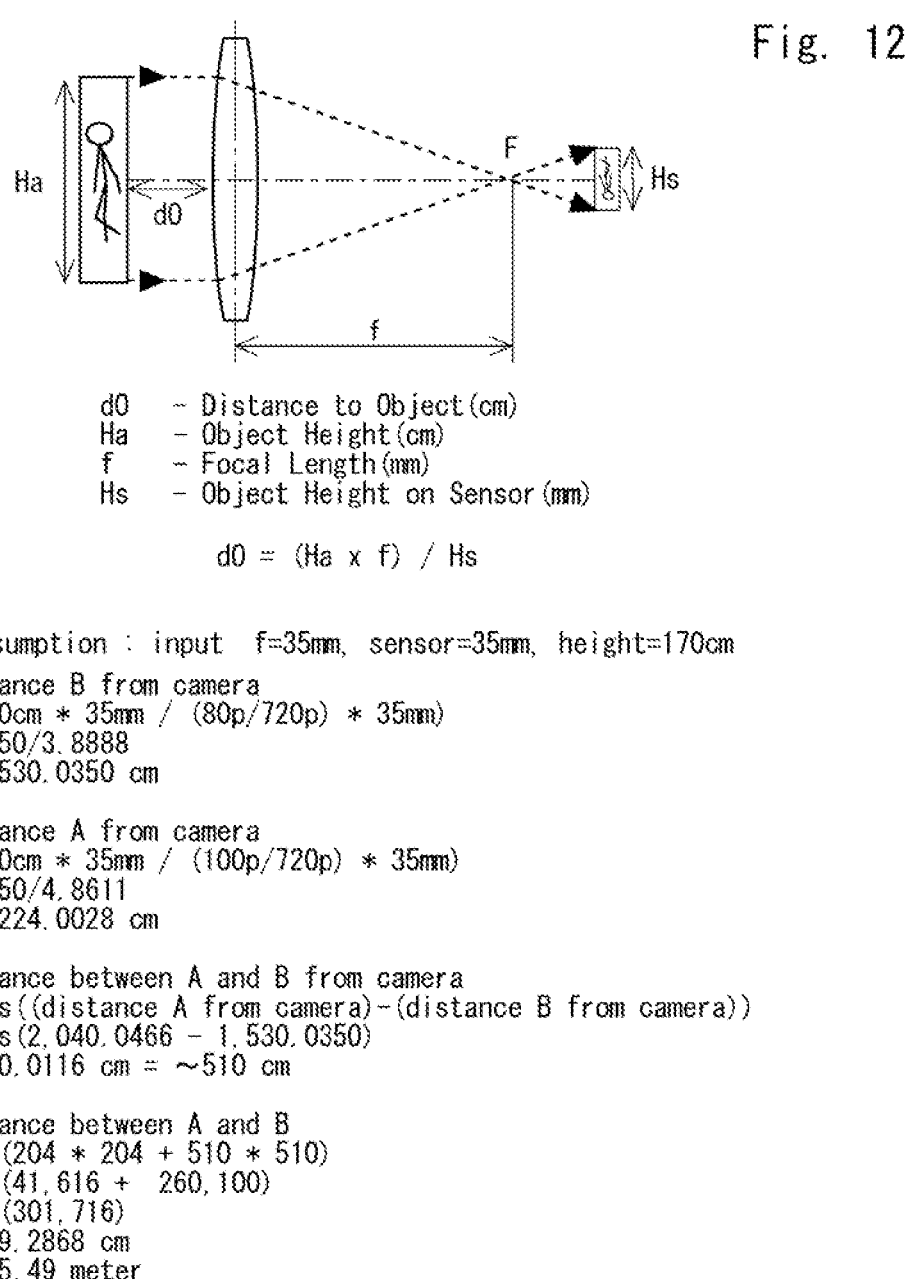

d0    – Distance to Object(cm)
Ha    – Object Height(cm)
f     – Focal Length(mm)
Hs    – Object Height on Sensor(mm)

$$d0 = (Ha \times f) / Hs$$

Assumption : input  f=35mm, sensor=35mm, height=170cm
Distance B from camera
=(170cm * 35mm / (80p/720p) * 35mm)
= 5950/3.8888
= 1,530.0350 cm Distance A from camera
=(170cm * 35mm / (100p/720p) * 35mm)
= 5950/4.8611
= 1,224.0028 cm Distance between A and B from camera
= abs((distance A from camera)-(distance B from camera))
= abs(2,040.0466 - 1,530.0350)
= 510.0116 cm = ~510 cm Distance between A and B
= √(204 * 204 + 510 * 510)
= √(41,616 +  260,100)
= √(301,716)
= 549.2868 cm
= ~5.49 meter

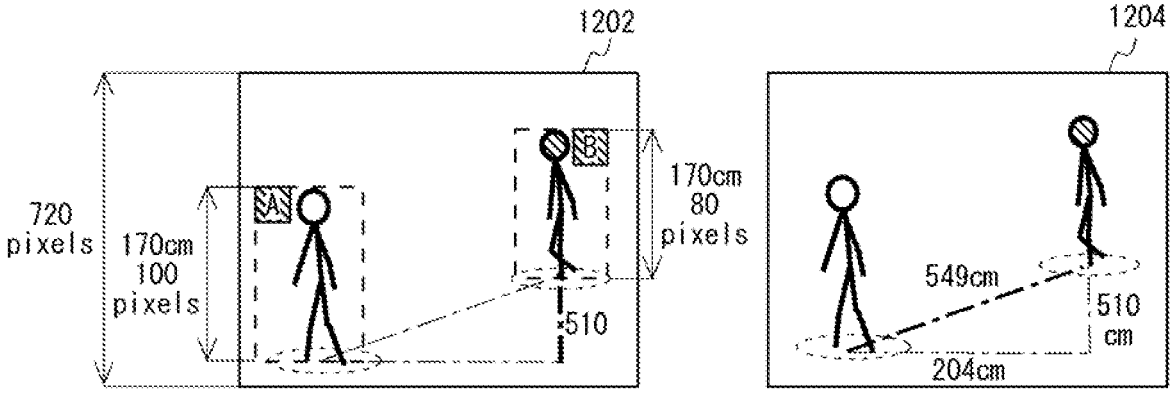

METHOD AND APPARATUS FOR CANCELLING ANONYMIZATION FOR AN AREA INCLUDING A TARGET

This application is a National Stage Entry of PCT/JP2022/ 009052 filed on Mar. 3, 2022, which claims priority from Singapore patent application Ser. No. 10202108597X filed on Aug. 5, 2021, the contents of all of which are incorporated herein by reference, in their entirety.

TECHNICAL FIELD

The present invention relates broadly, but not exclusively, to a method and an apparatus for cancelling anonymization for an area including a target and their interacted subjects.

BACKGROUND ART

Video surveillance is widely used by law and security enforcement as the primary tool to monitor their areas and prevent crime and terrorism. Though the general public support the usage of video surveillance because of their effectiveness in crime-prevention, deterrence, and post investigation, there is also growing privacy concerns of their misuse and abuse as they do involve intruding into ordinary people everyday lives.

The video data captured contain privacy sensitive information and this indiscriminate shooting is a critical issue for people who highly regard their privacy and are unwilling to be revealed.

Privacy infringement can become a significant social problem. To tackle privacy infringement, video surveillance needs to anonymize irrelevant and unnecessary data without forgoing its capabilities and performance.

SUMMARY OF INVENTION

Technical Problem

Existing face recognition solutions often apply anonymization technologies on the detected face for data privacy protection. Similar to all other object detection algorithms limitation, face detection algorithms in face recognition solution may face missed detection due to algorithms configuration and training dataset.

Solution to Problem

The present provides a method for cancelling anonymization for an area including a target in an input image, the method comprising: retrieving historical images in which the target has appeared in; identifying an area by comparing the input image and the retrieved historical images to determine if the target has interacted with at least one of the identified subjects; and cancelling anonymization for the target and identified subjects that the target has interacted with.

The present provides an apparatus for cancelling anonymization for an area including a target in an input image, the apparatus comprising: at least one memory that is configured to store instructions; and at least one processor that is configured to execute the instructions to: retrieve historical images in which the target has appeared in; identify an area by comparing the input image and the retrieved historical images to determine if the target has interacted with at least one of the identified subjects; and cancel anonymization for the area including the target.

BRIEF DESCRIPTION OF DRAWINGS

The accompanying Figures, where like reference numerals refer to identical or functionally similar elements throughout the separate views and which together with the detailed description below are incorporated in and form part of the specification, serve to illustrate various embodiments and to explain various principles and advantages in accordance with a present embodiment, by way of non-limiting example only.

Embodiments of the invention will be better understood and readily apparent to one of ordinary skill in the art from the following written description, by way of example only, and in conjunction with the drawings, in which:

FIG. 12 shows another example of how to perform interaction detection using 3D distance calculation according to an embodiment of the present disclosure.

DESCRIPTION OF EMBODIMENTS

Figure 1:
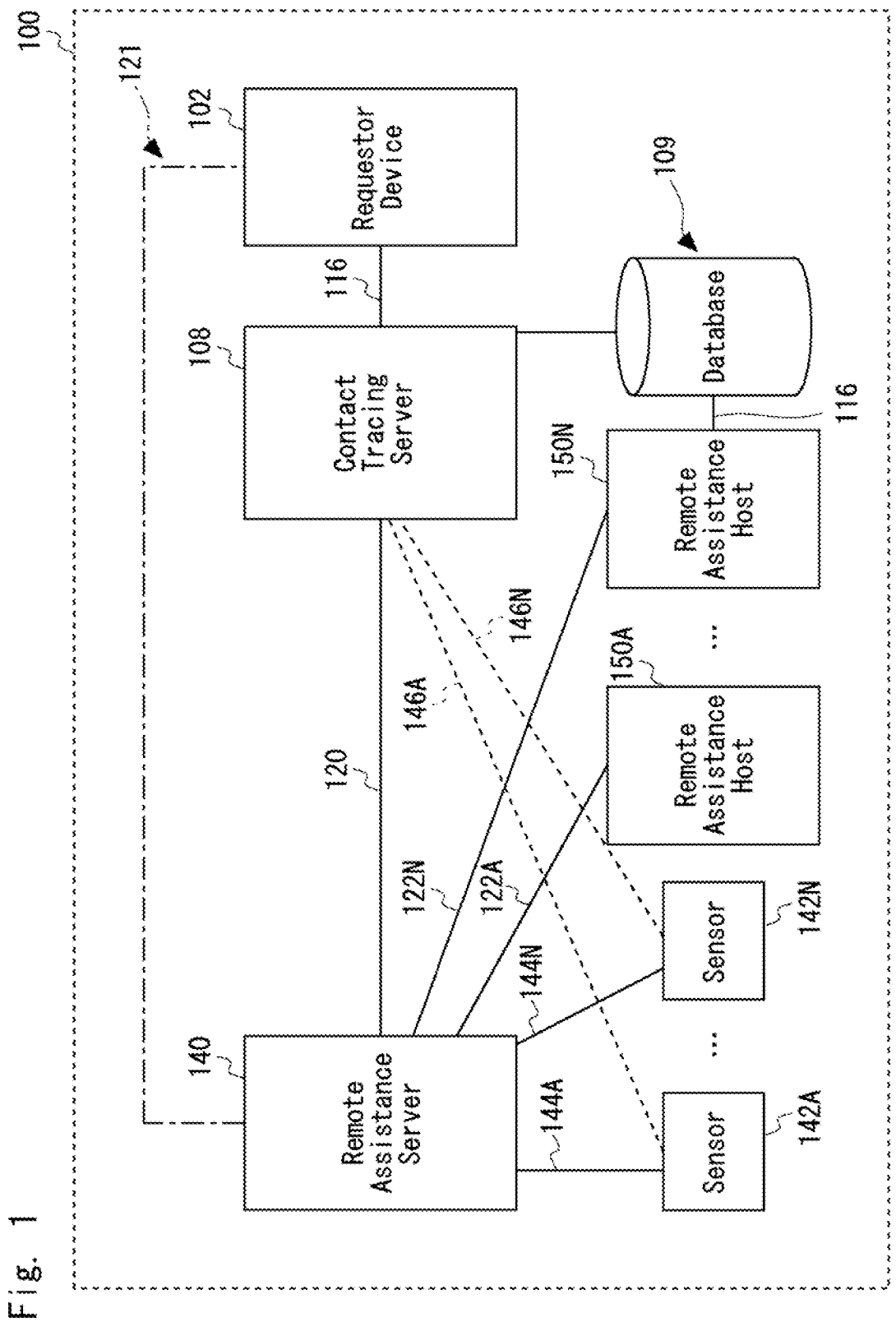
FIG. 1 shows a system for cancelling anonymization for an area including a target and identified subjects that the target has interacted with in an input image according to an aspect of the present disclosure.

Herein disclosed are embodiments of an apparatus and methods for cancelling anonymization for an area including a target that addresses one or more of the above problems.

Furthermore, other desirable features and characteristics will become apparent from the subsequent detailed description and the appended claims, taken in conjunction with the accompanying drawings and this background of the disclosure.

Terms Description

Subject—a subject may be any suitable type of entity, which may include a person, a patient and a user.

The term target or target subject is used herein to identify a person, a user or patient that is of interest. The target subject may be one that is selected by a user input or one who is identified to be of interest.

A subject or an identified subject is used herein to relate to a person who is related to or appear with the target subject (e.g., partner or companion) in an input image. For example, in the context of pandemic outbreak, the subject is someone who may have interacted or appeared together with the target.

A user who is registered to a contact tracing server will be called a registered user. A user who is not registered to the contact tracing server will be called a non-registered user. It is possible for the user to obtain graphical representation of any subject on a network graph.

Contact tracing server—The contact tracing server is a server that hosts software application programs for receiving inputs, processing data and objectively providing graphical representation. The contact tracing server communicates with any other servers (e.g., a remote assistance server) to manage requests. The contact tracing server communicates with a remote assistance server to display a graphical representation of a potential subject and a target subject. Contact tracing servers may use a variety of different protocols and procedures in order to manage the data and provide a graphical representation.

The contact tracing server is usually managed by a provider that may be an entity (e.g., a company or organization) which operates to process requests, manage data and display graphical representations that are useful to a situation. The server may include one or more computing devices that are used for processing graphical representation requests and providing customizable services depending on situations.

A contact tracing account—a contact tracing account is an account of a user who is registered at a contact tracing server. In certain circumstances, the contact tracing account is not required to use the remote assistance server. A contact tracing account includes details (e.g., name, address, vehicle etc.) of a user.

The contact tracing server manages contact tracing accounts of users and the interactions between users and other external servers, along with the data that is exchanged.

DETAILED DESCRIPTION

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of devices which form public knowledge through their use. Such should not be interpreted as a representation by the present inventor(s) or the patent applicant that such devices in any way form part of the common general knowledge in the art.

The System 100

FIG. 1 illustrates a block diagram of a system 100 for cancelling anonymization for areas of the target person and areas of any identified subjects interacted with the target person in the historical images. The system 100 comprises a requestor device 102, a contact tracing server 108, a remote assistance server 140, remote assistance hosts 150A to 150N, and sensors 142A to 142N.

The requestor device 102 is in communication with a contact tracing server 108 and/or a remote assistance server 140 via a connection 116 and 121, respectively. The connection 116 and 121 may be wireless (e.g., via NFC communication, Bluetooth, etc.) or over a network (e.g., the Internet). The connection 116 and 121 may also be that of a network (e.g., the Internet).

The contact tracing server 108 is further in communication with the remote assistance server 140 via a connection 120. The connection 120 may also be that of a network (e.g., the Internet). In one arrangement, the contact tracing server 108 and the remote assistance server 140 are combined and the connection 120 may be an interconnected bus.

The remote assistance server 140, in turn, is in communication with the remote assistance hosts 150A to 150N via respective connections 122A to 122N. The connections 122A to 122N may be a network (e.g., the Internet).

The remote assistance hosts 150A to 150N are servers. The term host is used herein to differentiate between the remote assistance hosts 150A to 150N and the remote assistance server 140. The remote assistance hosts 150A to 150N are collectively referred to herein as the remote assistance hosts 150, while the remote assistance host 150 refers to one of the remote assistance hosts 150. The remote assistance hosts 150 may be combined with the remote assistance server 140.

In an example, the remote assistance host 150 may be one managed by a hospital and the remote assistance server 140 is a central server that manages emergency calls and decides which of the remote assistance hosts 150 to forward data or retrieve data like image inputs.

Sensors 142A to 142N are connected to the remote assistance server 140 or the contact tracing server 108 via respective connections 144A to 144N or 144A to 144N. The sensors 142A to 142N are collectively referred to herein as the sensors 142A to 142N. The connections 144A to 144N are collectively referred to herein as the connections 144, while the connection 144 refers to one of the connections 144. Similarly, the connections 146A to 146N are collectively referred to herein as the connections 146, while the connection 146 refers to one of the connections 146. The connections 144 and 146 may also be that of a network. The sensor 142 may be one of an image capturing device, video capturing device, and motion sensor and may be configured to send an input depending its type, to at least one of the contact tracing server 108.

In the illustrative embodiment, each of the devices 102 and 142; and the servers 108, 140, and 150 provides an interface to enable communication with other connected devices 102 and 142 and/or servers 108, 140, and 150. Such communication is facilitated by an application programming interface ("API"). Such APIs may be part of a user interface that may include graphical user interfaces (GUIs), Web-based interfaces, programmatic interfaces such as application programming interfaces (APIs) and/or sets of remote procedure calls (RPCs) corresponding to interface elements, messaging interfaces in which the interface elements correspond to messages of a communication protocol, and/or suitable combinations thereof.

Use of the term 'server' herein can mean a single computing device or a plurality of interconnected computing devices which operate together to perform a particular function. That is, the server may be contained within a single hardware unit or be distributed among several or many different hardware units.

The Remote Assistance Server 140

The remote assistance server 140 is associated with an entity (e.g., a company or organization or moderator of the service). In one arrangement, the remote assistance server 140 is owned and operated by the entity operating the server 108. In such an arrangement, the remote assistance server 140 may be implemented as a part (e.g., a computer program module, a computing device, etc.) of server 108.

The remote assistance server 140 may also be configured to manage the registration of users. A registered user has a contact tracing account (see the discussion above) which includes details of the user. The registration step is called on-boarding. A user may use either the requestor device 102 to perform on-boarding to the remote assistance server 140.

It is not necessary to have a contact tracing account at the remote assistance server 140 to access the functionalities of the remote assistance server 140. However, there are functions that are available to a registered user. For example, it may be possible to display graphical representation of target subjects and potential subjects in other jurisdictions. These additional functions will be discussed below.

The on-boarding process for a user is performed by the user through one of the requestor device 102. In one arrangement, the user downloads an app (which includes the API to interact with the remote assistance server 140) to the sensor 142. In another arrangement, the user accesses a website (which includes the API to interact with the remote assistance server 140) on the requestor device 102.

Details of the registration include, for example, name of the user, address of the user, emergency contact, or other important information and the sensor 142 that is authorized to update the remote assistance account, and the like.

Once on-boarded, the user would have a contact tracing account that stores all the details.

The Requestor Device 102

The requestor device 102 is associated with a subject (or requestor) who is a party to a contact tracing request that starts at the requestor device 102. The requestor may be a concerned member of the public who is assisting to get data necessary to obtain a graphical representation of a network graph. The requestor device 102 may be a computing device such as a desktop computer, an interactive voice response (IVR) system, a smartphone, a laptop computer, a personal digital assistant computer (PDA), a mobile computer, a tablet computer, and the like.

In one example arrangement, the requestor device 102 is a computing device in a watch or similar wearable and is fitted with a wireless communications interface.

The Contact Tracing Server 108

The contact tracing server 108 is as described above in the terms description section.

The contact tracing server 108 is configured to process processes relating to cancel anonymization for areas of the target person and areas of any identified subjects in the historical images.

The Remote Assistance Hosts 150

The remote assistance host 150 is a server associated with an entity (e.g., a company or organization) which manages (e.g., establishes, administers) information regarding information relating to a subject.

In one arrangement, the entity is a hospital. Therefore, each entity operates a remote access host 150 to manage the resources by that entity. In one arrangement, a remote access host 150 receives an alert signal that a target subject is likely to be carrier of a virus.

Advantageously, such information is valuable to the law enforcement. It reduces number of hours looking through camera footage to investigate the possible links between persons of interest who may have interacted in the past.

The information is particularly useful in the pandemic, so that building management and the health sector can more efficiently and effectively carry out contact tracing. The network of interactions between the target and other subjects helps to identify how the disease spreads from one person to another.

Conventionally, the relevant subjects who may have interacted with the target is not shown. That is, anonymization is only cancelled for the target. There are also other conventional techniques that anonymize using detection technique. That is, all detected persons in an input image are anonymized. In an existing technique, moving subject are anonymized using foreground or background extraction. More commonly, background of an image may be blurred or image anonymization may be done on a predefined segment/area of image, or the other way around, to exclude the area of interest of image anonymization.

The present disclosure provides image anonymization to protect innocent person but cancel anonymization for targeted person with his/her interacted potential subjects. Combining detected face algorithms of targeted person with full image background anonymization can helps to preserve better privacy of innocent person, but it also hides away many details of interaction of targeted person with his/her potential associates around him/her.

Sensor 142

The sensor 142 is associated with a user associated with the requestor device 102. More details of how the sensor may be utilized will be provided below.

Figure 2A:
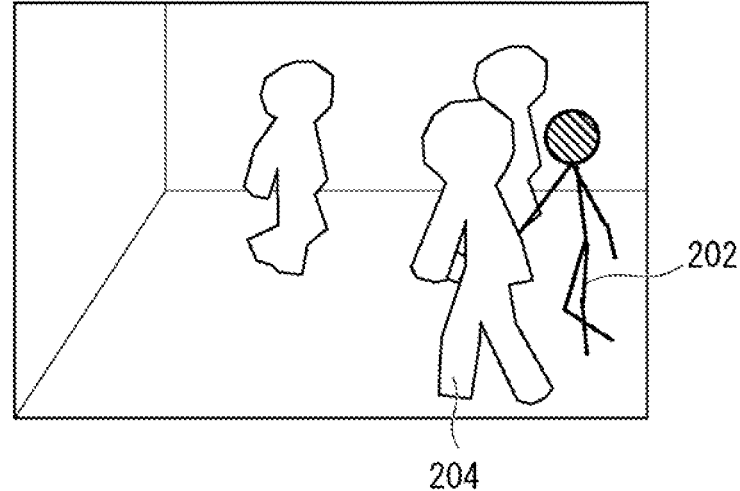
FIG. 2A shows how conventional technique cancels anonymization for the target.

FIG. 2A shows how conventional technique cancels anonymization for the target. As shown in FIG. 2A, conventional technique cancels anonymization for the target 202. Subject 204 may be one who has interacted with the target 202 and according to conventional technique, anonymization is not cancelled for subject 204.

Figure 2B:
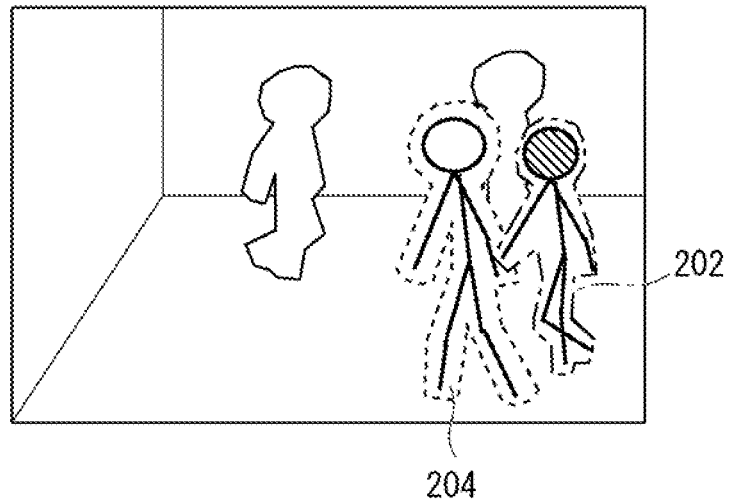
FIG. 2B shows how the present disclosure cancels anonymization for the target and an identified subject.

FIG. 2B shows how the present disclosure anonymization for the target and an identified subject. As shown in FIG. 2B, this present disclosure cancels anonymization for the target 202 and subject 204 who may be one who has interacted with the target 202. More information can be provided in the following.

Figure 3:
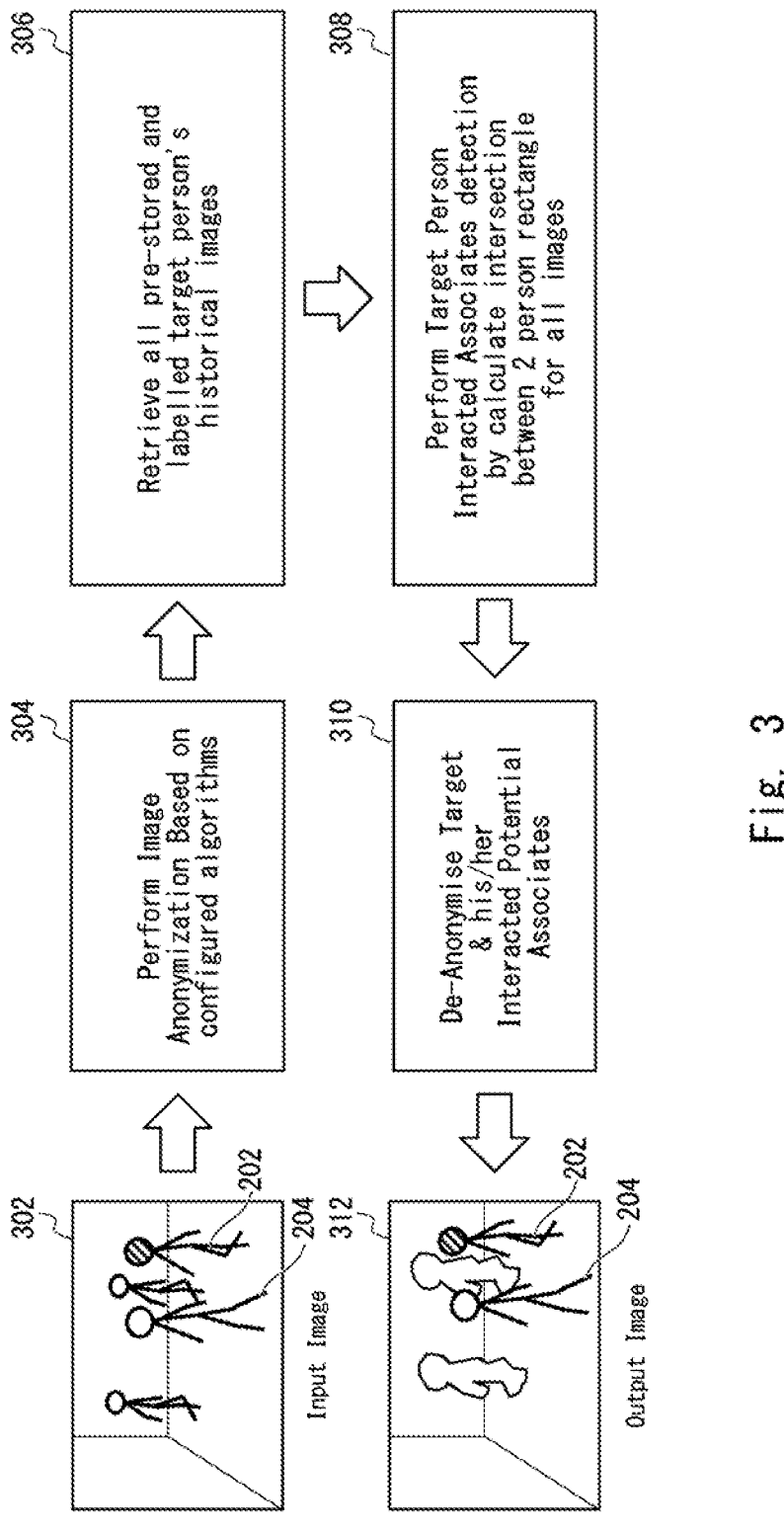
FIG. 3 shows the key advantages according to an embodiment of the present disclosure.

FIG. 3 shows the key advantages according to an embodiment of the present disclosure. An input image 302 including a target 202 and a subject 204 among a plurality of other subjects may be received. At 304, image anonymization is performed based on configured or predefined algorithms. At step 306, all pre-stored and labelled target person's historical images are retrieved from a database. At step 308, a processing step is performed to detect the interaction by the target with other subjections by calculating intersection between rectangle coordinates of two people for retrieved historical information. At step 310, the area in the input image 302 involving the target and subjects who have interacted with the target are de-anonymized. An output image 312 is output.

Figure 4:
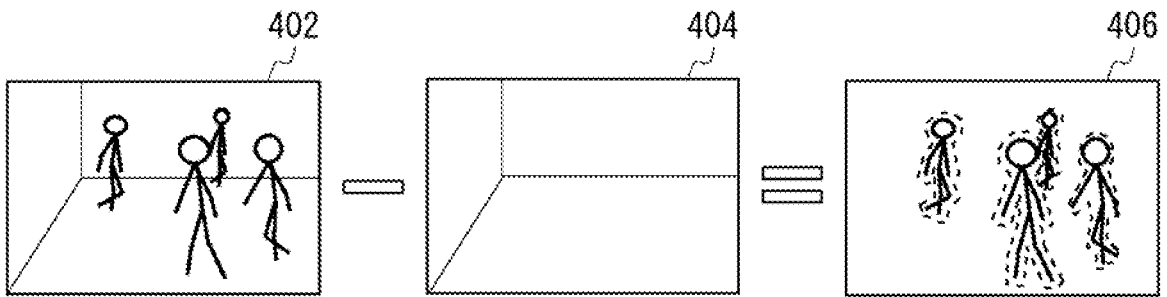
FIG. 4 shows a step of how the present disclosure removes the background to generate the foreground image that includes identified subjects according to an embodiment of the present disclosure.

FIG. 4 shows a step of how the present disclosure cancels anonymization for the target and an identified subject according to an embodiment of the present disclosure.

In FIG. 4, an input image 402 is received. The method includes applying background image subtraction to input image 402 for foreground image extraction as shown in 404. A sample extracted foreground image is shown in 406.

Figure 5:
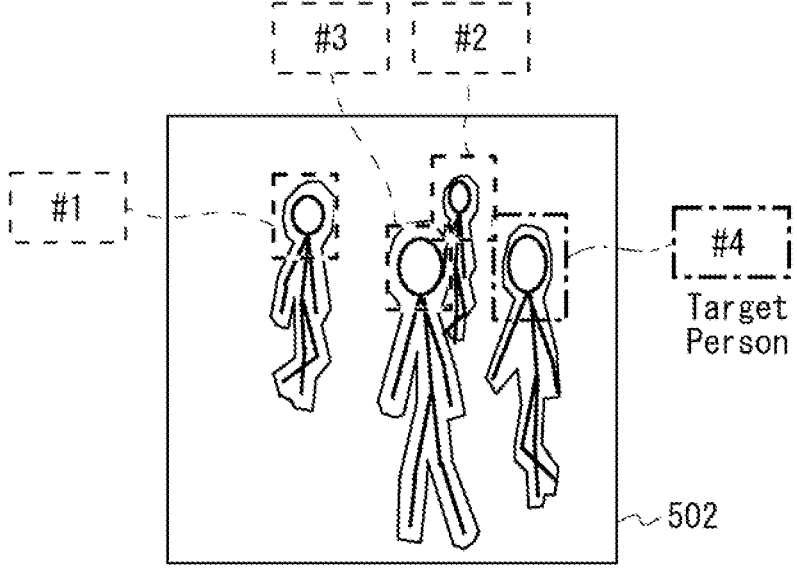
FIG. 5 shows that the one of the identified subjects matches the target person according to an embodiment of the present disclosure.

FIG. 5 may follow FIG. 4. As shown in 502, face recognition may be performed on the extracted foreground image against a predefined target list. As a result of the face recognition, #4 may be matched as the target person found in targeted person list.

Figure 6:
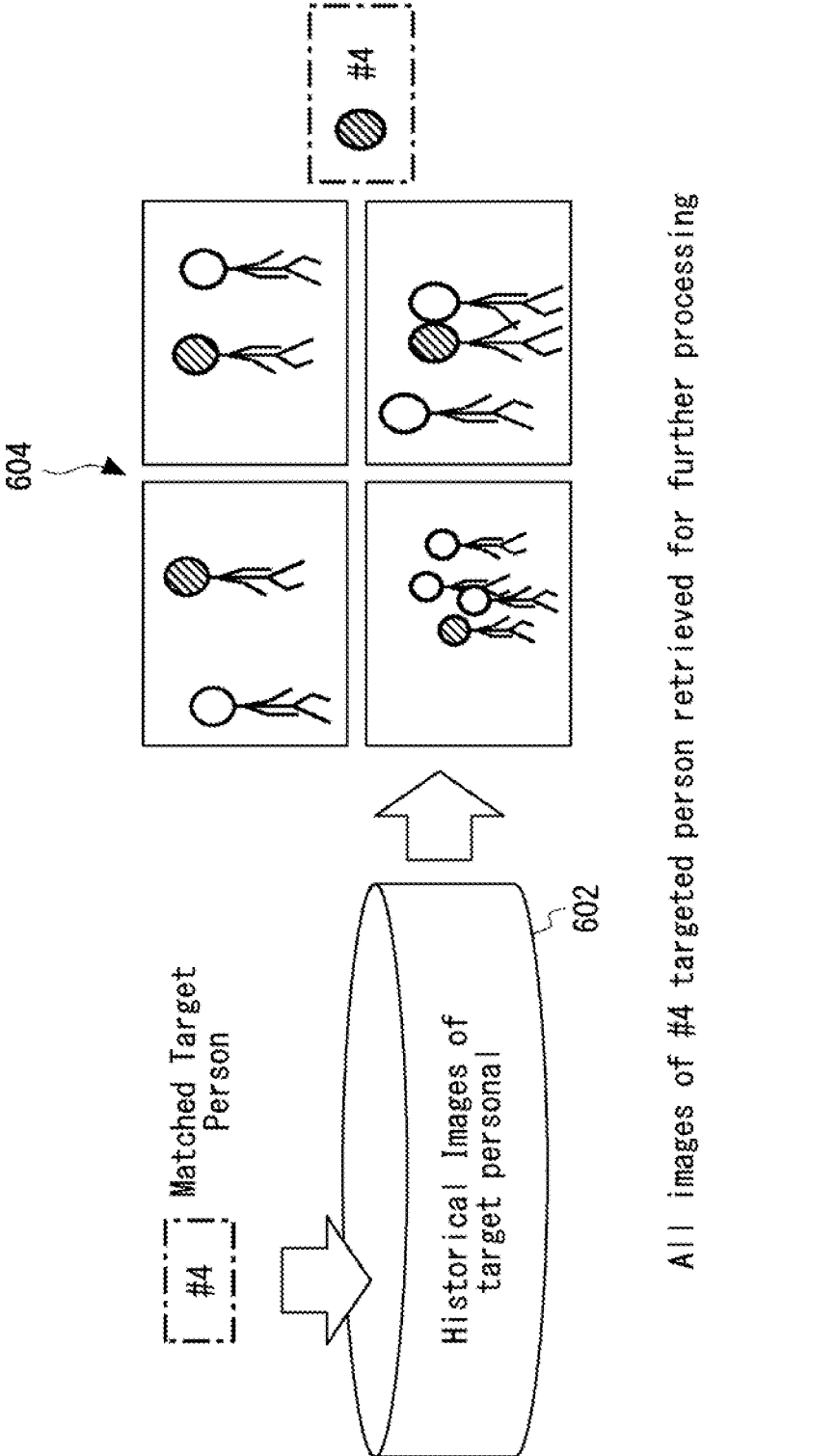
FIG. 6 shows a flow chart for retrieving the appearances of the target person from the historical images according to an embodiment of the present disclosure.

FIG. 6 may follow FIG. 5. In FIG. 6, retrieve all the pre-stored historical images of the matched target are retrieved as shown in 602. That is, historical information relating to the target is retrieved and images in which the target have appeared are identified, as shown in 604.

Figure 7:
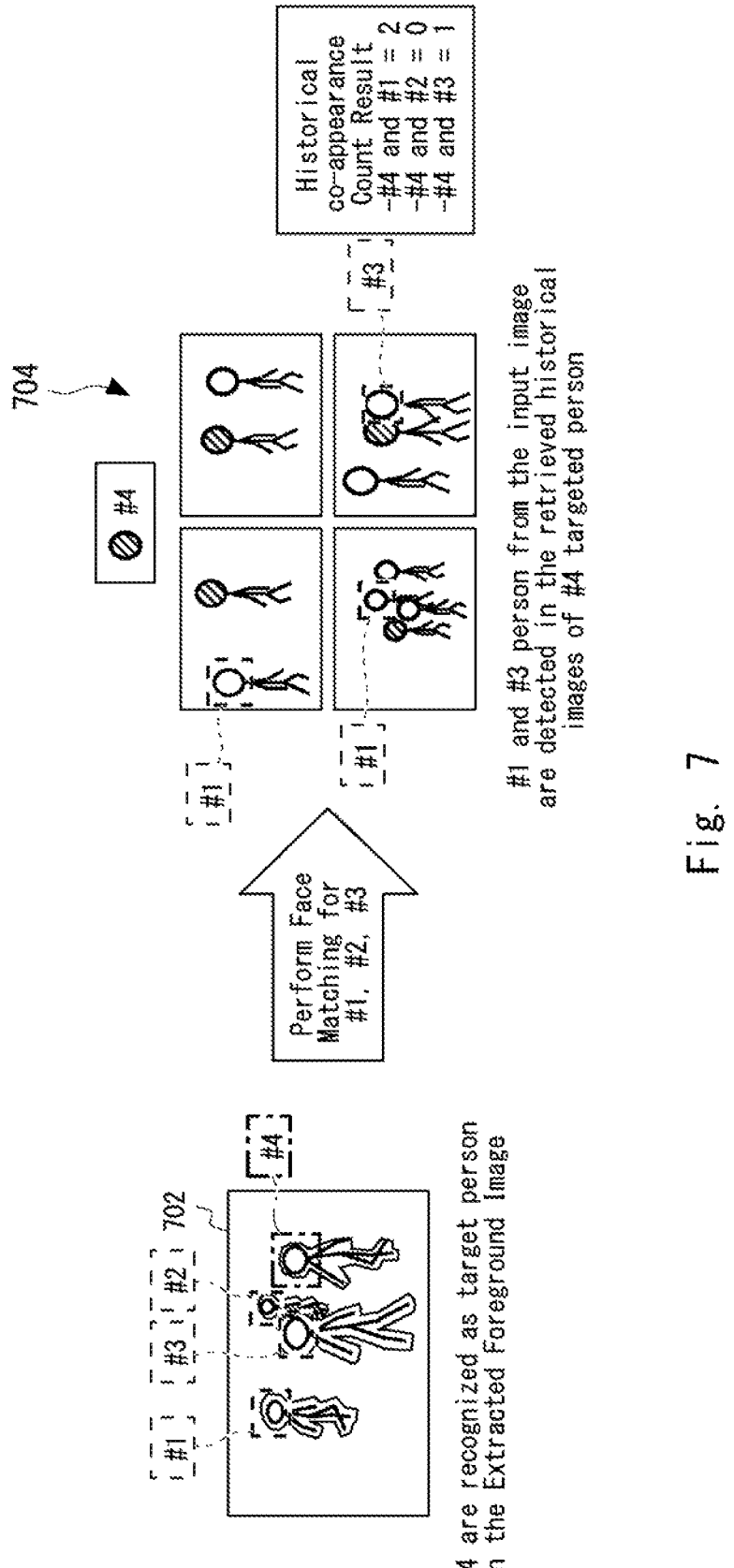
FIG. 7 shows a flow chart of finding the rest of the identified subjects in the foreground image among the appearances of the target person according to an embodiment of the present disclosure.

FIG. 7 may follow FIG. 6. In FIG. 7, subjects, for example, #1, #2 and #3, who have appeared with the target in the input image are identified. It is to be appreciated that it may be just one subject in some embodiments. In 702, face matching for each identified subjects, are performed on the retrieved images of the targeted (#4). #1 and #3 subject from the input image are detected in the retrieved historical information of #4 target. #1 appeared in the retrieved historical information of #4 target twice and #3 appeared in the retrieved historical information of #4 target once. As such, the count of co-appearances for #4 and #1 is 2; that for #4 and #2 is 0 and that #4 and #3 is 1.

Figure 8:
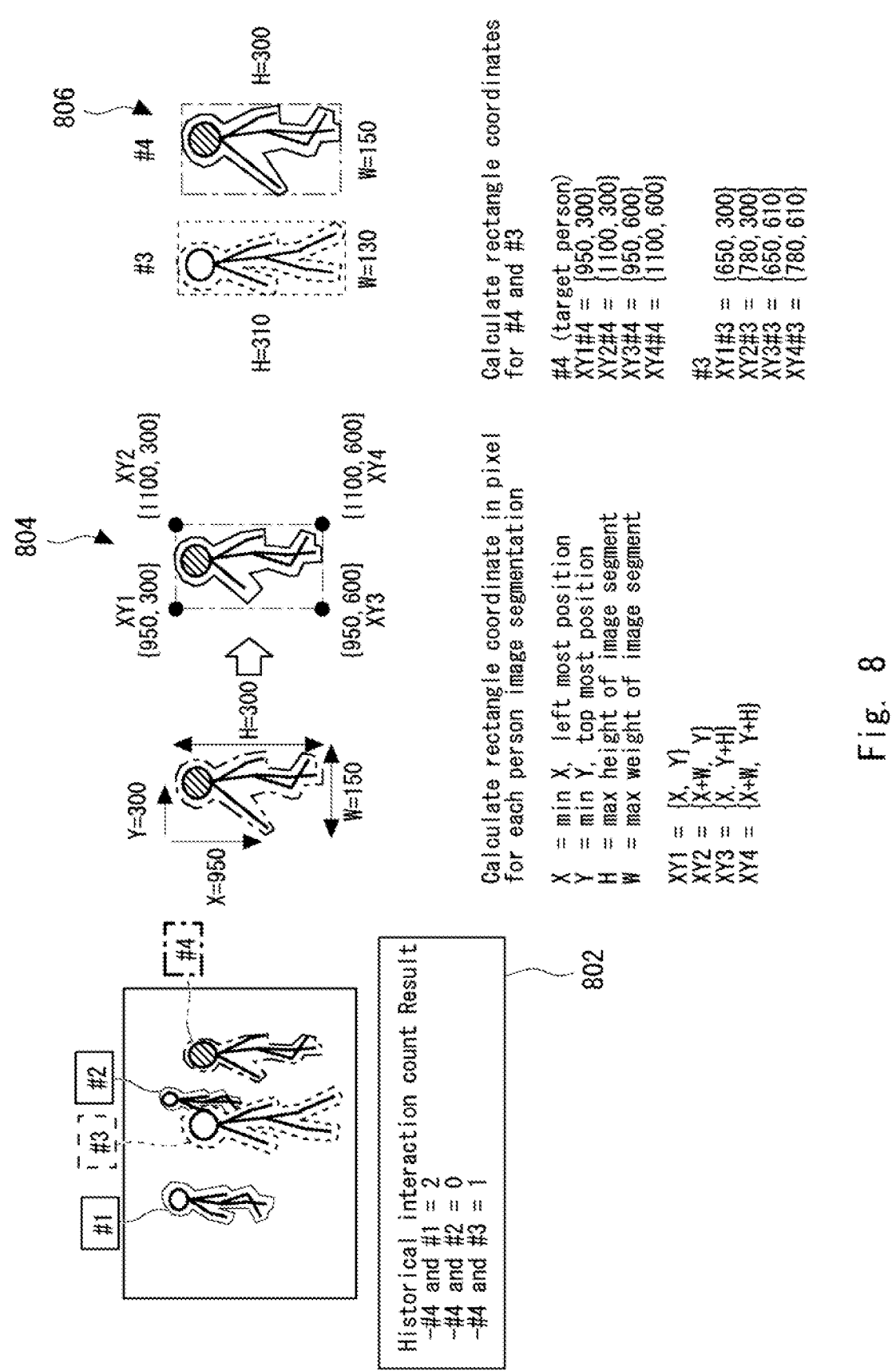
FIG. 8 shows how to calculate the coordinates of the appearances of the target and the identified subjects in the historical images according to an embodiment of the present disclosure.

FIG. 8 may follow FIG. 7. The count of interaction for #4 and #1 is 2; that for #4 and #2 is 0 and that #4 and #3 is 1 based on the historical information is shown in 802.

In 804, rectangle coordinates in pixel for each subject is calculated in image segmentation, where X=min X, left most position; Y=min Y, top most position; H=max height of image segment; W=max weight of image segment. In an embodiment, the rectangle coordinates may be calculated based on XY1={X, Y}; XY2={X+W, Y}; XY3={X, Y+H}; and XY4={X+W, Y+H}.

In 806, rectangle coordinates for #4 and #3 are calculated. In one embodiment, the rectangle coordinates for #4 may be XY1 #4={950,300}; XY2 #4={1100,300}; XY3 #4={950, 600}; and XY4 #4={1100,600}. Additionally or alternatively, the rectangle coordinates for #3 may be XY1 #3={650,300}; XY2 #3={780,300}; XY3 #3={650,610}; and XY4 #3={780,610}.

Figure 9:
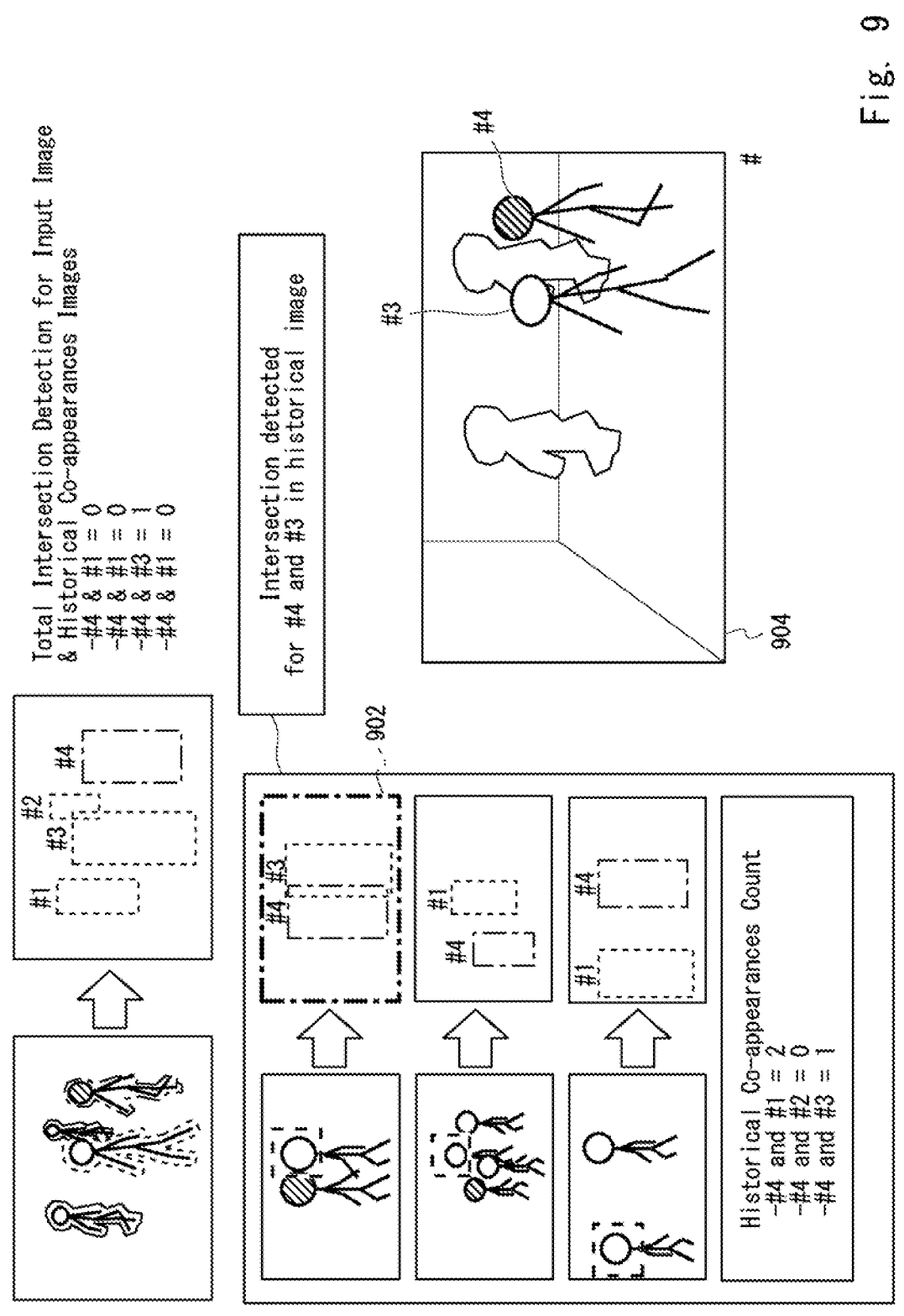
FIG. 9 shows how the historical co-appearances are counted using the intersection detection on the historical images according to an embodiment of the present disclosure.

FIG. 9 may follow FIG. 8. As mentioned in FIG. 7, face matching for each identified subjects, are performed on the retrieved images of the targeted (#4). #1 and #3 subject from the input image are detected in the retrieved historical information of #4 target. #1 appeared in the retrieved historical information of #4 target twice and #3 appeared in the retrieved historical information of #4 target once. As such, the count of co-appearances for #4 and #1 is 2; that for #4 and #2 is 0 and that #4 and #3 is 1. Image segmentation may be performed on each historical image and it may be determined that there is an intersection between the rectangular coordinates of #4 and #3 as shown in 902. In this example, #3 and #4 may be de-anonymized in the input image.

Figure 10:
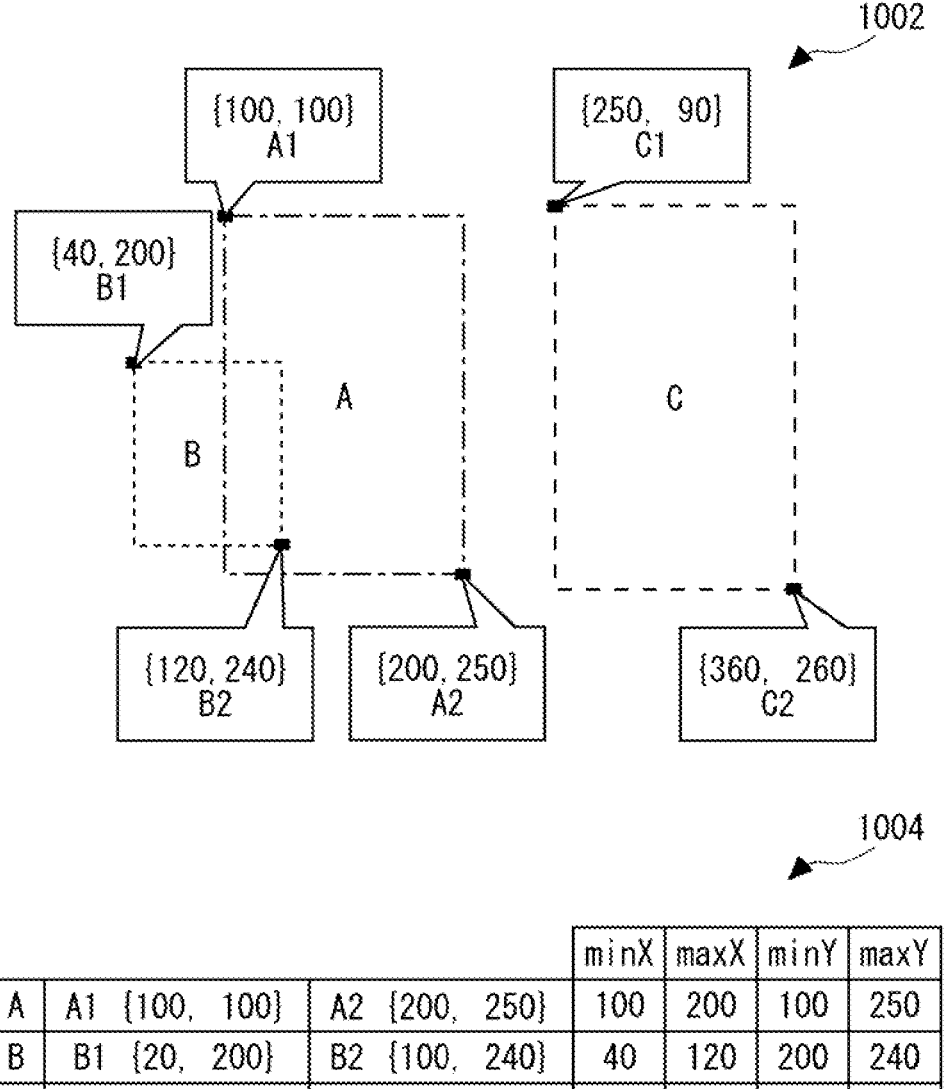
FIG. 10 shows how to determine the minimum and maximum X coordinate and Y coordinate from the top left point and the bottom right point of a rectangle according to an embodiment of the present disclosure.

FIG. 10 may follow FIG. 9. FIG. 10 shows in detail how rectangular coordinates may be used to determine if there is an intersection between a subject and the target subject. The following may be used:

$$\text{Intersect-}W=\text{Math·max}(0,\text{Math·min}(R1\text{·max } X,R2\text{·max } X)-\text{Math·max}(R1\text{·min } X,R2\text{·min } X)) \quad \text{Equation 1:}$$

$$\text{Intersect-}H=\text{Math·max}(0,\text{Math·min}(R1\text{·max } Y,R2\text{·max } Y)-\text{Math·max}(R1\text{·min } Y,R2\text{·min } Y)) \quad \text{Equation 2:}$$

Intersection is detected when both Intersect-W and Intersect-H value are greater than 0. The rectangular coordinates of A, B and C are shown in 1002 and they are, A1 {100, 100}, A2 {200, 250}, B1 {20, 200}, B2 {100, 240}, C1 {250, 90} and C2 {360, 260}.

Based on the Equations (1) and (2): Intersection is detected between A(R1) & B(R2):

$$\text{Intersect-}W=\text{Math·max}(0,\text{Math·min}(200,120)-\text{Math·max}(100,40))=\text{Math·max}(0,120-100)=20$$

$$\text{Intersect-}H=\text{Math·max}(0,\text{Math·min}(250,240)-\text{Math·max}(100,200))=\text{Math·max}(0,240-200)=40$$

Based on the Equations (1) and (2): Intersection is not detected between A(R1) & C(R2):

$$\text{Intersect-}W=\text{Math·max}(0,\text{Math·min}(200,360)-\text{Math·max}(100,250))=\text{Math·max}(0,200-250)=0$$

$$\text{Intersect-}H=\text{Math·max}(0,\text{Math·min}(250,260)-\text{Math·max}(100,90))=\text{Math·max}(0,250-100)=150$$

Figure 11:
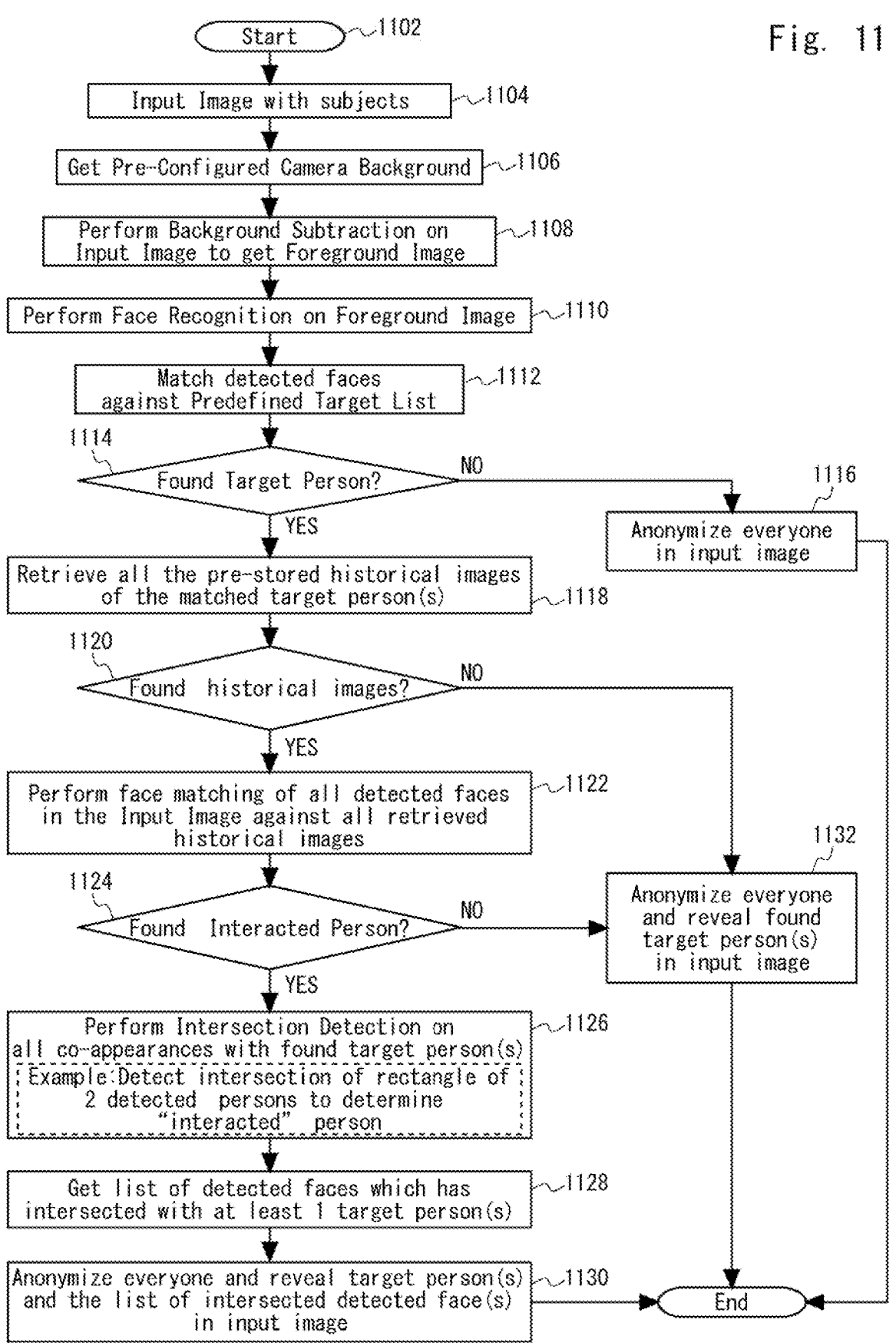
FIG. 11 shows a flow chart for adaptively displaying a target subject and identified subjects if any according to an embodiment of the present disclosure.

FIG. 11 shows a method of how to cancel anonymization for an area including a target according to an embodiment of the present disclosure. At step 1102, the method starts. Input image include the target and the subjects are received at step 1104. In an embodiment, pre-configures camera background may be obtained at step 1106. At step 1108, background subtraction is performed on the input image received at 1102 to get the foreground image. At step 1110, face recognition is performed on the foreground image after the background subtraction. At step 1112, the detected faces are matched against the predefined target list.

At step 1114, it is determined if the target person is found. If it is determined that the target person is not found, the method proceeds to anonymize every subject in the input image in step 1116. If it is determined that the target person is found, the method proceeds to retrieve all the pre-stored historical images of the matched target subject in step 1118.

At step 1120, it is determined if there are any historical images found. If it is determined that the historical images are not found, the method proceeds to anonymize every subject and reveal the found target person in the input image in step 1132. If it is determined that the historical images are found, the method proceeds to perform face matching of all detected faces in the input image against all retrieved historical in step 1122.

At step 1124, it is determined if there are any interacted persons found. If it is determined that the interacted persons are not found, the method proceeds to anonymize every subject and reveal the target person in the input image in step 1132. If it is determined that the interacted persons are found, the method proceeds to perform intersection detection on all co-appearances with found target subject identified in the input image in step 1126.

At step 1128, a list of detected subjects who have intersected with at least one target person is obtained. At step 1130, the method anonymizes every subject and reveal the target person in the input image and the list of intersected persons in the input image. It then proceeds to the end of the method.

FIG. 12 shows how intersection between a subject and the target subject may be determined in an embodiment of the present disclosure. In FIG. 12, three-dimensional (3D) distance between two persons is obtained by transforming the two-dimensional (2D) image person into real life 3D location and calculate the distance between two persons to determine if it's equal or less than a predefined distance, example within 1 meter.

It is assumed that the input f=35 mm, sensor=35 mm, height=170 cm, the distance of subject B from camera as shown in 1202 is tabulated to:

$$(170 \text{ cm} * 35 \text{ mm}/(80 \text{ } p/720 \text{ } p) * 35 \text{ mm}) = 5950/3.8888$$

$$= 1,530.0350 \text{ cm}$$

The distance of subject A from camera as shown in 1202 is tabulated to:

$$(170 \text{ cm} * 35 \text{ mm}/(100 \text{ } p/720 \text{ } p) * 35 \text{ mm}) = 5950/4.8611$$

$$= 1,224.0028 \text{ cm}$$

As such, it is tabulated that the distance between A and B from camera as shown in 1204:

$$\begin{aligned} \text{abs((distance } A \text{ from camera)} - \\ \text{(distance } B \text{ from camera))} \end{aligned} = \text{abs}(2,040.0466 - 1,530.0350)$$

$$= 510.0116 \text{ cm}$$

$$= \sim 510 \text{ cm}$$

The distance between A and B as shown in 1204 is tabulated to:

$$\sqrt{(204 * 204 + 510 * 510)} = \sqrt{(41,616 + 260,100)}$$

$$= \sqrt{(301,716)}$$

$$= 549.2868 \text{ cm}$$

$$= \sim 5.49 \text{ meter}$$

Based on the tabulated distances between A and B from the camera, it is determined if the subjects A and B have intersected in an image.

Device 1300, hereinafter interchangeably referred to as a computer system 1300, where one or more such computing devices 1300 may be used to execute the methods shown above. The exemplary computing device 1300 can be used to implement the system 100 shown in FIG. 1. The following description of the computing device 1300 is provided by way of example only and is not intended to be limiting.

Figure 13:
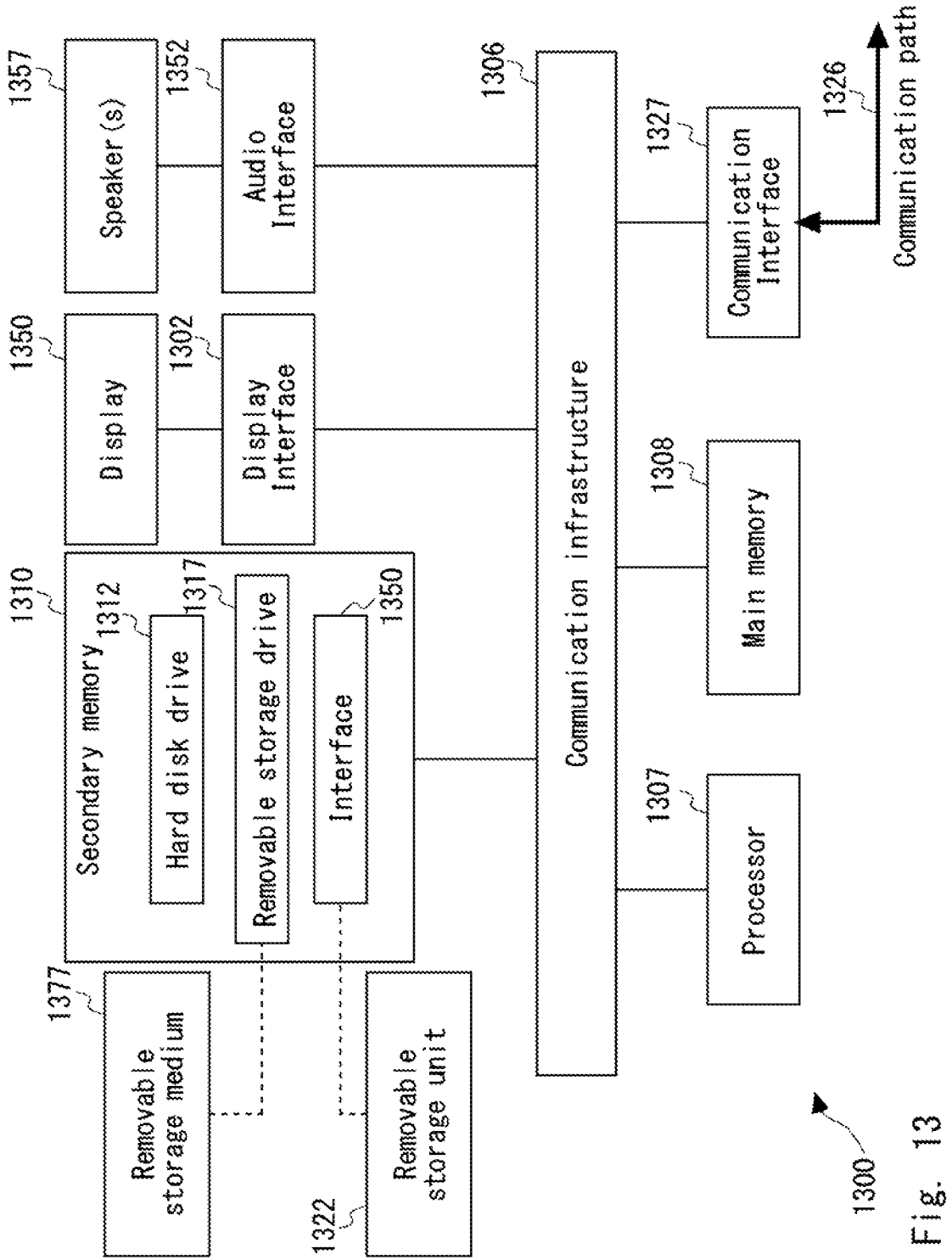
FIG. 13 shows an exemplary computing device that may be used to execute the method of the earlier figures.

As shown in FIG. 13, the example computing device 1300 includes a processor 1307 for executing software routines. Although a single processor is shown for the sake of clarity, the computing device 1300 may also include a multi-processor system. The processor 1307 is connected to a communication infrastructure 1306 for communication with other components of the computing device 1300. The communication infrastructure 1306 may include, for example, a communications bus, cross-bar, or network.

The computing device 1300 further includes a main memory 1308, such as a random access memory (RAM), and a secondary memory 1310. The secondary memory 1310 may include, for example, a storage drive 1312, which may be a hard disk drive, a solid state drive or a hybrid drive and/or a removable storage drive 1317, which may include a magnetic tape drive, an optical disk drive, a solid state storage drive (such as a USB flash drive, a flash memory device, a solid state drive or a memory card), or the like. The removable storage drive 1317 reads from and/or writes to a removable storage medium 1377 in a well-known manner. The removable storage medium 1377 may include magnetic tape, optical disk, non-volatile memory storage medium, or the like, which is read by and written to by removable storage drive 1317. As will be appreciated by persons skilled in the relevant art(s), the removable storage medium 1377 includes a computer readable storage medium having stored therein computer executable program code instructions and/or data.

In an alternative implementation, the secondary memory 1310 may additionally or alternatively include other similar means for allowing computer programs or other instructions to be loaded into the computing device 1300. Such means can include, for example, a removable storage unit 1322 and an interface 1350. Examples of a removable storage unit 1322 and interface 1350 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 1322 and interfaces 1350 which allow software and data to be transferred from the removable storage unit 1322 to the computer system 1300.

The computing device 1300 also includes at least one communication interface 1327. The communication interface 1327 allows software and data to be transferred between computing device 1300 and external devices via a communication path 1327. In various embodiments of the inventions, the communication interface 1327 permits data to be transferred between the computing device 1300 and a data communication network, such as a public data or private data communication network. The communication interface 1327 may be used to exchange data between different computing devices 600 which such computing devices 1300 form part an interconnected computer network. Examples of a communication interface 1327 can include a modem, a network interface (such as an Ethernet card), a communication port (such as a serial, parallel, printer, GPIB, IEEE 1394, RJ45, USB), an antenna with associated circuitry and the like. The communication interface 1327 may be wired or may be wireless. Software and data transferred via the communication interface 1327 are in the form of signals which can be electronic, electromagnetic, optical or other signals capable of being received by communication interface 1327. These signals are provided to the communication interface via the communication path 1327.

As shown in FIG. 13, the computing device 1300 further includes a display interface 1302 which performs operations for rendering images to an associated display 1350 and an audio interface 1352 for performing operations for playing audio content via associated speaker(s) 1357.

As used herein, the term "computer program product" may refer, in part, to removable storage medium 1377, removable storage unit 1322, a hard disk installed in storage drive 1312, or a carrier wave carrying software over communication path 1327 (wireless link or cable) to communication interface 1327. Computer readable storage media refers to any non-transitory, non-volatile tangible storage medium that provides recorded instructions and/or data to the computing device 1300 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 1300. Examples of transitory or non-tangible computer readable transmission media that may also participate in the provision of software, application programs, instructions and/or data to the computing device 1300 include radio or infra-red transmission channels as well as a network connection to another computer or net-worked device, and the Internet or Intranets including e-mail transmissions and information recorded on Websites and the like.

The computer programs (also called computer program code) are stored in main memory 1308 and/or secondary memory 1310. Computer programs can also be received via the communication interface 1327. Such computer pro-grams, when executed, enable the computing device 1300 to perform one or more features of embodiments discussed herein. In various embodiments, the computer programs, when executed, enable the processor 1307 to perform fea-tures of the above-described embodiments. Accordingly, such computer programs represent controllers of the com-puter system 1300.

Software may be stored in a computer program product and loaded into the computing device 1300 using the remov-able storage drive 1317, the storage drive 1312, or the interface 1350. The computer program product may be a non-transitory computer readable medium. Alternatively, the computer program product may be downloaded to the com-puter system 1300 over the communications path 1327. The software, when executed by the processor 1307, causes the computing device 1300 to perform the necessary operations to execute the method as described above.

It is to be understood that the embodiment of FIG. 13 is presented merely by way of example to explain the opera-tion and structure of the system 100. Therefore, in some embodiments one or more features of the computing device 1300 may be omitted. Also, in some embodiments, one or more features of the computing device 1300 may be com-bined together. Additionally, in some embodiments, one or more features of the computing device 1300 may be split into one or more component parts.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

This application is based upon and claims the benefit of priority from Singapore patent application No. 10202108597X, filed on Aug. 5, 2021, the disclosure of which is incorporated herein in its entirety by reference

What is claimed is:

1. A method for cancelling anonymization for an area including a target in an input image, the input image including a plurality of identified subjects, the method comprising:

retrieving historical images in which the target has appeared in;

determining at least one of the identified subject that has interacted with the target based on a location of the target in the input image, a location of each identified subject in the input image, a location of the target in each of the retrieved historical images, and a location of each identified subject in each of the retrieved historical images by comparing the input image and each of the retrieved historical images; and cancelling anonymization for an area including the target and the identified subject that has been determined to have interacted with the target in the input image based on the comparison.

2. The method according to claim 1, wherein the deter-mining the at least one of the identified subject by comparing the input image and the retrieved historical images includes:

determining that the target has not interacted with at least one of the identified subjects; and cancelling the anonymization for an area including the target in the input image.

3. The method according to claim 1, wherein the deter-mining the at least one of the identified subject by comparing the input image and the retrieved historical images includes:

performing face matching of the target and each identified subject on the retrieved historical images to determine if the target has interacted each identified subjects.

4. The method according to claim 1, wherein the deter-mining the at least one of the identified subject by comparing the input image and the retrieved historical image further includes:

determining at least one further subject who has interacted with the target based on the retrieved historical images; wherein the area for which the anonymization is can-celed includes the target and the identified at least one further subject.

5. The method according to claim 1, wherein the deter-mining the at least one of the identified subject by comparing the input image and the retrieved historical image includes:

determining rectangle coordinates for the target and each identified subject; and determining, for each of the identified subject, if a rect-angle area representing the target and a rectangle area representing the identified subject intersects each other.

6. An apparatus for cancelling anonymization for an area including a target in an input image, the apparatus compris-ing:

at least one memory that is configured to store instruc-tions; and at least one processor that is configured to execute the instructions to:

retrieve historical images in which the target has appeared in;

determine at least one of the identified subject that has interacted with the target based on a location of the target in the input image, a location of each identified subject in the input image, a location of the target in each of the retrieved historical images, and a location of each identified subject in each of the retrieved historical images by comparing the input image and each of the retrieved historical images; and cancel anonymization for an area including the target and the identified subject that has been determined to have interacted with the target in the input image based on the comparison.

7. The apparatus according to claim 6, wherein the at least one processor is further configured to:

determine that the target has not interacted with at least one of the identified subjects; and cancelling the anonymization for an area including the target in the input image.

8. The apparatus according to claim 6, wherein the at least one processor is further configured to:

perform face matching of the target and each identified subject on the retrieved historical images to determine if the target has interacted with each identified subjects.

9. The apparatus according to claim 6, wherein the at least one processor is further configured to:

identify at least one further subject who has interacted with the target based on the retrieved historical images; wherein the area for which the anonymization is canceled includes the target and the identified at least one further subject.

10. The apparatus according to claim 6, wherein the at least one processor is further configured to:

determine rectangle coordinates for the target and each identified subject; and determine, for each of the identified subject, if a rectangle area representing the target and a rectangle area representing the identified subject intersects each other.

11. A non-transitory computer-readable medium storing a program for cancelling anonymization for an area including a target in an input image, the input image including a plurality of identified subjects, the program causing a computer to execute:

retrieving historical images in which the target has appeared in;

determining at least one of the identified subject that has interacted with the target based on a location of the target in the input image, a location of each identified subject in the input image, a location of the target in each of the retrieved historical images, and a location of each identified subject in each of the retrieved historical images by comparing the input image and each of the retrieved historical images; and cancelling anonymization for an area including the target and the identified subject that has been determined to have interacted with the target in the input image based on the comparison.

\* \* \* \* \*